United States Patent [19]
Schoettler et al.

[11] Patent Number: 4,865,498
[45] Date of Patent: Sep. 12, 1989

[54] ELECTRODE DRESSING TOOL

[76] Inventors: Frank J. Schoettler, 1908 32nd Ave., Kenosha, Wis. 53140; Thomas D. Smith, 9050 26th Ave., Kenosha, Wis. 53142

[21] Appl. No.: 195,898

[22] Filed: May 19, 1988

[51] Int. Cl.⁴ ............................................. B23C 1/20
[52] U.S. Cl. ..................................... 409/175; 81/309; 219/119
[58] Field of Search ............... 409/175, 139, 178, 181; 219/119; 81/304, 305, 306, 307, 308, 309, 310, 488; 408/72 R; 407/33, 34, 9

[56] References Cited

U.S. PATENT DOCUMENTS

| | | | |
|---|---|---|---|
| 1,852,580 | 4/1932 | Kaminski | 81/309 |
| 2,415,896 | 2/1947 | Marsh et al. | 81/309 |
| 2,638,817 | 5/1953 | Hall | 407/33 X |
| 3,283,662 | 11/1966 | Weglin | 408/72 R |
| 3,820,437 | 6/1974 | Dyer et al. | 409/175 |

FOREIGN PATENT DOCUMENTS

| | | | |
|---|---|---|---|
| 87685 | 2/1982 | European Pat. Off. . | |
| 1503131 | 1/1970 | Fed. Rep. of Germany | 81/307 |
| 3323038 | 1/1985 | Fed. Rep. of Germany | 219/119 |
| 573292 | 9/1977 | U.S.S.R. | 219/119 |
| 524348 | 8/1940 | United Kingdom . | |
| 546792 | 7/1942 | United Kingdom | 219/119 |

*Primary Examiner*—William Briggs

[57] ABSTRACT

A tool for use in dressing the electrode tips of a welding machine. It is to be used in combination with conventional rotary dressing tools whereby one person can apply sufficient pressure on the tool to properly dress the welding tip. It consists of a clamping device to attach the tool of the invention to an electrode shank, and an adjustable lever arm to apply pressure to the dressing tool against the welding tip.

4 Claims, 2 Drawing Sheets

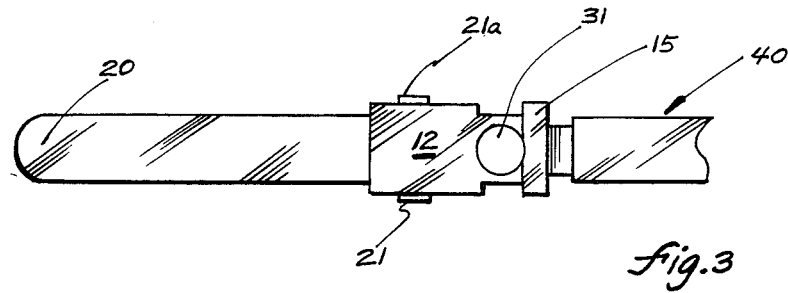
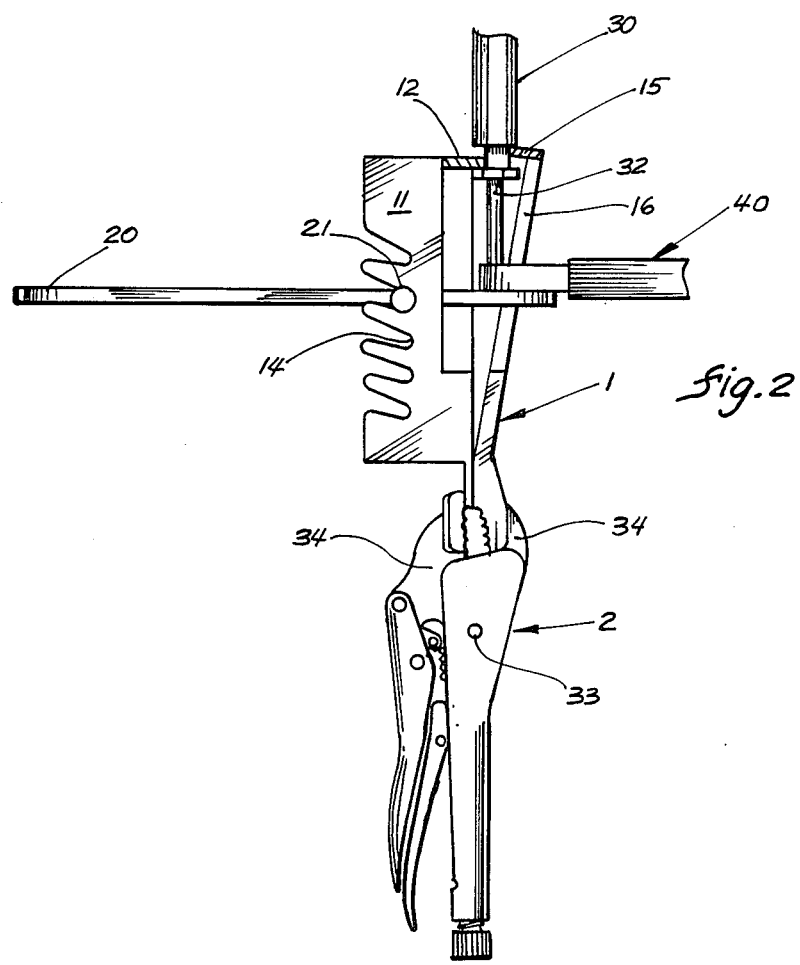

ELECTRODE DRESSING TOOL

This invention relates to spot welding and more particularly to a clamping tool to facilitate the dressing of the tips of a spot welding machine while they are operably mounted thereon.

BACKGROUND OF THE INVENTION

The electrodes of spot welding machines used in automotive manufacture are usually constructed of copper or an alloy thereof and have tips which are rounded or which are frusto-conical in shape. During use, these tips become deformed or distorted and contaminated with oxides or other foreign materials. Such deformation or contamination often interferes with or reduces the electrical conductivity of the tip, and results in welds which are weak.

The welding machines used on production lines, particularly in the automotive industry, have a plurality of welding tips which are brought into position simultaneously as the object to be welded progresses through the line. Sometimes such machines may have a dozen or more such tips, all of which need to be periodically dressed or reshaped after extended use. In the past, malformed or contaminated tips were merely replaced when they began to produce bad welds. Later, it was found that they could be revitalized by cleaning and/or reshaping. Several patent disclosures demonstrate tools devised for this purpose. U.S. Pat. No. 3,820,437, British Patent No. 524,348 and E.P. No. 87-685-A each discloses a power-driven dressing tool to restore a welding tip to its original shape by grinding off the foreign materials or removing some of the metal until the desired configuration is achieved. Such dressing tools obviously have been used for many years. The difficulty in employing them on welding machines having multiple electrode welding tips, has been the application of sufficient pressure of the tool against the tip so that each tip can be quickly and easily restored. On such welding machines, the electrodes often are merely suspended by a flexible means from a framework so as to prevent the operator holding the dressing tool from applying sufficient pressure to carry out the process easily or quickly. The practice noted by the present inventors has been for one person to hold and operate the dressing tool while one or two others apply pressure to hold the tool against the welding tip, sometimes using a timber, to obtain the requisite pressure.

SUMMARY OF THE INVENTION

By utilizing the clamping tool of the present invention, it is possible for one person to carry out the operation with a minimum of effort and to produce a tip which has a proper shape and whose surface is free from any oxide or foreign material.

BRIEF DESCRIPTION OF THE DRAWINGS

Turning now to the drawings,

FIG. 2 is a side elevation, partially in section, taken along the line 2—2 in FIG. 1; and FIG. 3 is a top plan view.

Figure 1:
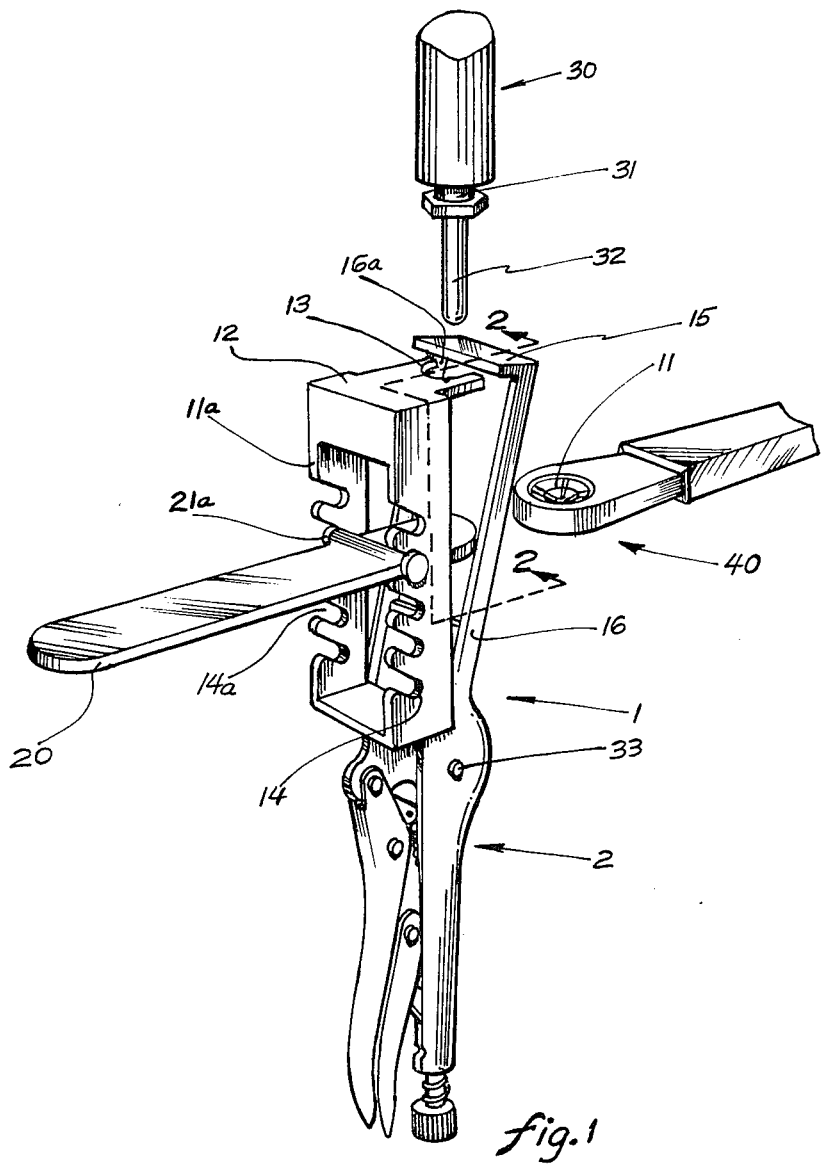
FIG. 1 is a perspective view showing the clamp of this invention.

The clamping tool shown generally at 1 consists of means by which manual pressure can be applied to engage the welding tip with the tool of the present invention. Manual pressure is applied through clamping means, activated by means of conventional clamping or "Vice Grip" pliers shown generally at 2 which has its jaws 34 welded to the other elements of the tool. The clamping means consists of an open framework adapted to engage or clamp the welding tip shown generally at 30. The open framework of the clamping means allows insertion of the dressing tool shown generally at 40, and of a lever 20. By properly inserting them, it is possible to apply pressure against the dressing tool and press it against the welding tip.

The open framework consists of two elements which are adapted to open and close with the clamping means 2 about its axis 33. The more massive of these elements consists of slotted plates 11 and 11a which are joined at their upper extremities by a top plate 12 having an arc 13 formed therein, said arc having a diameter sufficiently large to receive the shank 31 of the welding tip. Plates 11 and 11a are provided with slots 14 and 14a which are adapted to receive the trunnions 21 and 21a which are formed with or attached to lever 20.

There are a plurality of slots 14 and 14a shown in the open framework in order to accommodate welding tips of different lengths. Obviously if the welding tip is quite short, the lever 20 would be inserted at or near the top slot. Conversely with a tip which had not been dressed very often or which is much longer in length, the lever would be inserted in one of the lower slots.

The cooperating frame of the clamp of this invention consists of a bar 15 which connects opposing rails 16 and 16a. The bar is adapted, upon closure of the clamping means 2 to hold the shank 31 of the welding tip within the arcuate opening 13 of top plate 12.

In use, the dressing tool 40, having blades 41 which are rotated by a suitable source of power, not shown, is brought to bear against the welding tip 32 after its shank has been clamped within the tool of the present invention. The trunnions 21 and 21a of the lever 20 are positioned in an appropriate slot 14 and 14a whereby one end of the lever 20 may be pressed against the underside of the dressing tool 40, and by applying downward pressure to the opposite end of lever 20, the dressing tool is forced under pressure against tip 32 until it is properly dressed.

It will be understood that changes can be made in certain details, including the choice of materials, and the arrangement of the parts as compared to those herein shown and described without departing from the scope of the invention claimed herein. The illustrations of the nature of the present invention are not intended to be limiting in any way other than as expressed in the appended claims.

The embodiments of the invention in which exclusivity is claimed are as follows:

1. A device for applying pressure to a welding tip dressing tool of the kind having rotatable cutter blades, said pressure being applied through said tool against the tip of a welding electrode to reshape the same, comprising clamping means for engaging the shank of said electrode tip, said clamping means having an open framework adapted to receive such dressing tool in a position to allow it to be brought to bear against said tip; said clamping means comprising a fulcrum, and a lever received by said fulcrum, said lever being pivotable to exert pressure on said dressing tool to force said cutter blades against said electrode welding tip and effectively to reshape said electrode welding tip.

2. A device according to claim 1, wherein said clamping means has a plurality of fulcrums whereby said lever may be inserted at such position as required by the position of the electrode tip to be dressed.

3. A device according to claim 2, wherein said lever has a trunnion at one end adapted to cooperate with the fulcrum in the framework of said clamping means.

4. A device according to claim 1, wherein said clamping means is a clamping plier.

* * * * *